June 2, 1964     T. R. KENDRICK III, ET AL     3,135,802
PREPARATION OF BORON CONTAINING FUELS
Filed Feb. 20, 1958
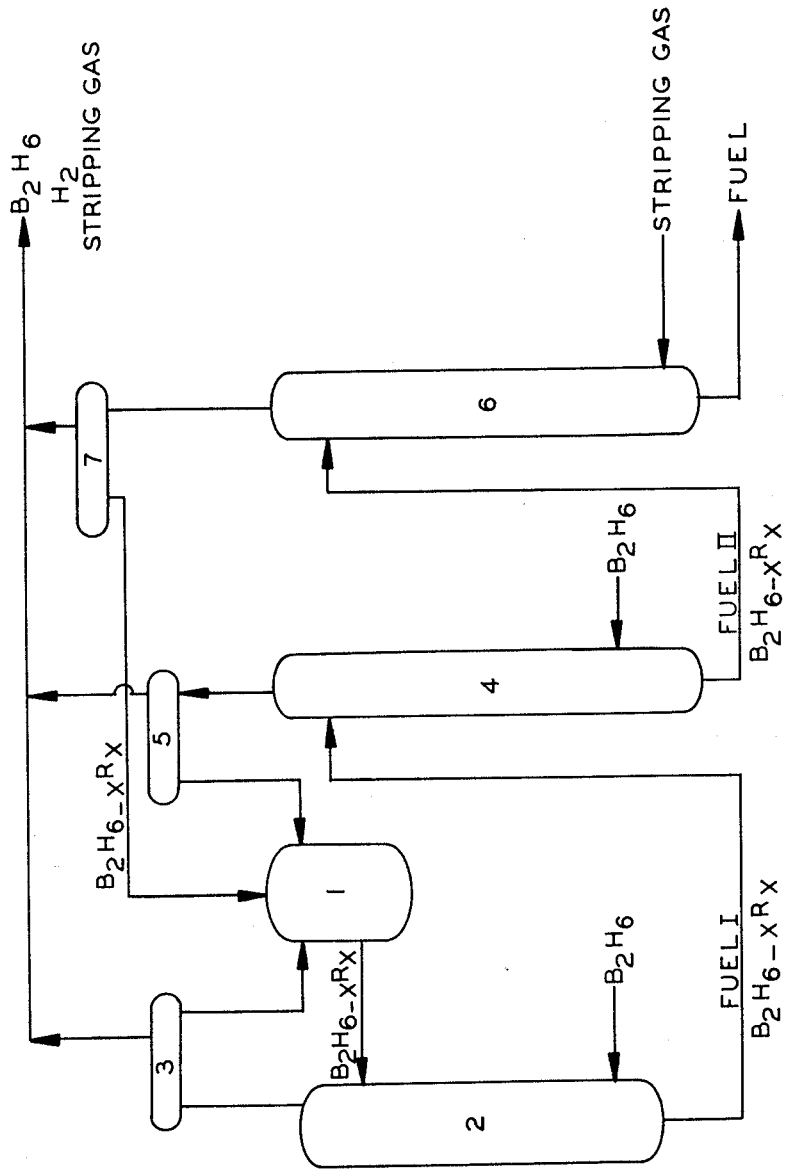
Thomas R. Kendrick, III
David K. Ends
John W. Wagner
INVENTOR.
BY Donald L. Rose / 3,135,802
PREPARATION OF BORON CONTAINING FUELS
Thomas R. Kendrick III, Lawrence, Kans., and David K. Eads, Allison Park, and John W. Wagner, Zelienople, Pa., assignors to Callery Chemical Company, Pittsburgh, Pa., a corporation of Pennsylvania
Filed Feb. 20, 1958, Ser. No. 716,514
11 Claims. (Cl. 260—606.5)

This invention relates to an improved method of preparing liquid high energy fuels containing boron, carbon and hydrogen, and more particularly to a method of preparing alkylpentaborane(9) fuels and alkyldecaborane fuels, $B_{10}H_{14-x}R_x$, from alkyldiboranes, $H_2B_{6-x}R_x$, and diborane, $B_2H_6$.

There has recently arisen a considerable demand for liquid fuels that are easily handled and have a higher energy content than fuels available from natural sources such as the natural occurring hydrocarbons. Since the only elements with a higher heat of combustion than gasoline are hydrogen, beryllium and boron, any compound with a higher heat of combustion per unit weight than gasoline must contain a large proportion of hydrogen, beryllium or boron. It has recently been ascertained that the lower alkyl derivatives of higher boranes such as pentaborane(9), $B_5H_9$, and decaborane, $B_{10}H_{14}$, have properties making them almost ideally suited for use as high energy fuels, such as relatively low volatility, wide liquidus range, high heat of combustion, and relatively high spontaneous ignition temperatures. Alkylpentaboranes and alkyldecarboranes had previously been prepared from reaction of pentaborane(9) or decaborane and alkyl halides; however, since pentaborane or decaborane is required as a starting material, and since these are prepared from diborane only in rather poor yields, other methods of preparation were needed.

It has been determined that alkyldiboranes, or mixtures of alkyldiboranes could be pyrolyzed with diborane to produce a spectrum of products including alkyldecaborane and solid polymeric products. The mechanism of the reaction is not understood, but it is clear that numerous competing reactions and reaction species are involved. Such a reaction results in low yields of any particular species and severely handicaps a continuous operation as a result of the fouling and plugging of reaction equipment by the solid polymers inherently formed, and attempts to direct the reactions to produce high proportions of alkyldecarboranes without the formation of solid polymeric materials have been to no avail. We have discovered that the desired materials can be produced in good yields without the formation of significant amounts of solid polymeric by-products by careful control of reaction conditions.

This invention is based on the discovery that a liquid high energy fuel containing predominately alkyldecaboranes can be prepared without the formation of solid by-products by contacting lower alkyldiboranes and diborane in two stages; the first stage at conditions of relatively high temperature and low pressure, the second stage at relatively low temperature and high pressure. An intermediate product which contains a high proportion of alkylpentaboranes is formed in the first stage which is itself useful as a fuel as well as useful in the further reaction with diborane to form a fuel with a higher energy content. Any of the lower alkyldiboranes, e.g., ethyldiboranes and methyldiboranes, and mixtures of lower alkyldiboranes, e.g., ethyldiboranes and propyldiboranes may be used.

FIGURE 1 is a flow diagram schematically illustrating one mode of performing the invention. Lower alkyldiboranes are fed from storage tank 1 to the reactor 2, where they are countercurrently contacted with diborane at a temperature from 110° to 170° C. and a pressure from 15 to 70 p.s.i.g. The alkyldiboranes have the general formula $B_2H_{6-x}R_x$ where $x$ is from 1 to 4 and R is an alkyl radical. The diborane partial pressure and the temperature determine the composition of the liquid alkyldiboranes since the equilibrium reaction

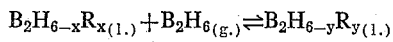

$$B_2H_{6-x}R_{x(1.)} + B_2H_{6(g.)} \rightleftharpoons B_2H_{6-y}R_{y(1.)}$$

where $x$ is an integer from 1 to 4 and larger than $y$, is reversible. Thus at any specified conditions of diborane pressure and temperature the boron content of the equilibrium mixture of liquid alkyldiboranes is always the same. Thus any alkyldiborane may be used in the reaction; however, it is generally preferred to use an alkyldiborane feed composition having a boron content greater than that equivalent to tetraalkyldiborane.

The reaction occurring in reactor 2 produces a liquid intermediate product of low volatility admixed with unreacted alkyldiboranes and by-product hydrogen. The unused diborane, by-product hydrogen, and any vaporized alkyldiboranes pass through water cooled condenser 3, in which the alkyldiboranes are condensed and returned to storage tank 1. The liquid intermediate product admixed with non-vaporized alkyldiboranes is discharged from reactor 2 and is fed to reactor 4, where it is countercurrently contacted with additional diborane at a temperature from 50° C. to 100° C. and a pressure in excess of about 150 p.s.i.g. to produce a fuel product, predominately alkyldecarborane, admixed with unreacted alkyldiborane and by-product hydrogen. Any vaporized alkyldiboranes are separated from hydrogen and unreacted diborane by condenser 5 and returned to storage tank 1. The mixture of fuel and unreacted alkyldiboranes is flashed down to atmospheric pressure and fed to a stripping column 6 where the unreacted alkyldiboranes are stripped from the fuel product with a gas. The alkyldiboranes are removed from the stripping gas by condenser 7 and returned to storage tank 1. When hydrogen or diborane is used as a stripping gas, the non-condensibles from condensers 3, 5 and 7 are conveniently combined and sent to a gas separation system. The diborane may be separated from hydrogen by a variety of convention methods, e.g., condensation or absorption. Any other non-oxidizing gas may be used as a stripping gas, e.g., $N_2$, $CH_4$ or argon. The stripped fuel product rich in alkyldecaboranes is removed and sent to storage containers, from which it is distributed for use. The drawing schematically illustrates the methods and does not indicate the pumps, valves, and pressure regulators which are required between the stages and vessels. Throughout the entire process there are practically no by-product solids formed to reduce the yield of fuel or foul the reaction systems. The individual reactions in the process are hereinafter discussed in detail.

Lower alkyldiboranes and diborane react readily when contacted at a pressure between about 15 and 70 p.s.i.g. and a temperature between about 100 and 170° C. to form a liquid product of low volatility that contains a moderately high boron content, e.g., ethyldiboranes and diborane form a product which is predominately ethylpentaboranes-(9) containing about 27 to 43% boron. This intermediate product, hereinafter designated as Fuel I, is admixed with unreacted alkyldiboranes which are much more volatile than Fuel I and may be separated from these unreacted alkyldiboranes by convention distillation or stripping methods. Fuel I may be used directly as a high energy fuel or it may be reacted further with diborane, either alone or admixed with alkyldiboranes, at different conditions to form a fuel with a higher heat of combustion.

Within the above stated temperature and pressure range the reaction proceeds upon contact of the reactants to give the liquid Fuel I and by-product hydrogen; there are no undesirable solid products formed provided the reaction is not continued for too long a time. Fuel I forms at a regular rate, dependent on the temperature, pressure, and reactant concentrations, until the concentration of Fuel I in the liquid reaction mixture is about 25 to 30%. If the reaction is then continued further, another liquid product is formed at a rate several times faster than the rate of formation of Fuel I at corresponding conditions. This liquid product is believed to be polymeric as evidenced by its high viscosity and very low volatility. Although this liquid polymer may be used as a fuel, it is not satisfactory for further reaction with diborane to produce an alkyldecarborane fuel, since its presence in appreciable amounts results in the formation of solid polymeric material in the subsequent reaction. The time at which the Fuel I reaction should be stopped varies dependent on reaction conditions, but is easily determined for any reaction conditions by measuring the amount of Fuel I in the reaction mixture. The reaction to form Fuel I is easily performed in a batch or a continuous process as is illustrated by the following typical procedures.

Batch reactions were carried out in a pressurized autoclave equipped with suitable feed lines, a slow speed agitator, and a gas discharge line. There was a water cooled reflux condenser in the gas discharge line to return the vaporized liquid, and a back pressure regulator to maintain a desired pressure on the autoclave. The liquid alkyldiboranes were charged into the autoclave and were saturated with diborane at operating pressure and room temperature. The reactor was then heated to operating temperature, and gases were discharged because of the increase in pressure caused by the increase in temperature and the generation of hydrogen from the reaction. Diborane was continually added to the reactor. At the completion of the reaction the liquid products, a mixture of Fuel I and unreacted alkyldiboranes, were removed.

Fuel I was also produced by the continuous countercurrent contacting of alkyldiboranes and diborane. The reaction was a vertically situated three inch diameter stainless steel pipe, 18 inches long, baffled to separate it into six physical stages, and was heated by a steam jacket. Each stage was equipped with a two inch turbine agitator. A measured stream of alkyldiboranes was fed into the top stage, and a measured stream of gaseous diborane was fed into the bottom of the reactor. The liquid product was removed continuously from the bottom of the reactor through an overflow leg to a receiver. The volatile products passed through a water cooled condenser, to remove vaporized liquid which was returned to the reactor through the alkyldiborane feed line. The non-condensible flow from the reactor was controlled by a back pressure regulator which automatically proportioned the flow to maintain a fixed pressure in the reactor.

The degree of alkylation of Fuel I, measured by the boron and carbon content of the product, was found to be dependent on the reaction temperature, the reaction pressure, and to a lesser extent the ratio of alkyldiboranes to diborane used. The reaction or contact time affects only the amount of Fuel I formed and does not affect its quality, so long, of course as the concentration of Fuel I in the reaction mixture is not permitted to exceed about 30%.

The boron content of Fuel I decreases, i.e. the degree of alkylation increases, with an increase in temperature at constant pressure as is illustrated by the results from reactions using ethyldiboranes set forth in Table I.

TABLE I

*Boron Content of Fuel I*

[Pressure=35 p.s.i.g.]

| Temperature (° C.) | Boron Content (wt. percent) |
|---|---|
| 112 | 42 |
| 135 | 35 |
| 140 | 30 |

The boron content of Fuel I increases with an increase in pressure at constant temperature and there is a larger composition charge for a given pressure change at higher temperatures as is illustrated by reactions using ethyldiboranes shown in Table II.

TABLE II

*Boron Content of Fuel I*

| Temperature (° C.) | 130° | | 150° | |
|---|---|---|---|---|
| Pressure (p.s.i.g.) | 30 | 50 | 30 | 50 |
| Boron Content (wt. percent) | 34 | 40 | 24 | 36 |

The boron content is also affected by the ratio of diborane to alkyldiborane used; however, this effect is minor relative to the temperature and pressure effects. For convenience the amount of alkyldiborane fed is designated throughout the specification as the trialkyldiborane equivalent of the boron content of the actual feed material, since the actual alkyldiborane composition in the reactor is determined by the temperature and pressure conditions, e.g., 10 grams of ethyldiboranes containing 22% boron is equivalent to 11.4 grams of triethyldiborane. There is a slight increase in boron content when the proportion of diborane fed is higher. This is illustrated in Table II which shows the boron content of Fuel I from reaction of ethyldiborane and diborane with feed ratios of ethyldiborane to diborane from 79:1 to 2.5:1.

TABLE III

| Temperature (° C.) Pressure, p.s.i.g. | 152° 50 | | | | 120° 35 | | | |
|---|---|---|---|---|---|---|---|---|
| Ratio: ethyldiboranes/diborane | 11.6 | 9.4 | 4.4 | 2.5 | 79 | 58 | 44 | 30 |
| Boron Content (wt. percent) | 31.9 | 32.8 | 33.9 | 35.6 | 30.4 | 30.7 | 31.2 | 32.2 |

Although the reaction proceeds when no additional diborane is used, only a very small amount of Fuel I is formed, and a high proportion of undesirable liquid polymeric materials are formed. It is preferred to use feed ratios of about 5:1 to 20:1, since large excesses of diborane are not required to be recycled, and since the reaction conditions are more difficult to maintain at steady state with too small a diborane feed rate.

The effects of the process parameters on the boron content of Fuel I may be estimated by the empirical expression Wt. percent boron in Fuel I
$$=45+(0.1P-0.75)(T-100)1.08$$

where $T=$ ° C. and $P=$ pressure in p.s.i.g., which was derived from results of reactions using a 10:1 ratio of ethyldiborane to diborane. For reactions using less alkyldiborane the boron content will be somewhat higher, and using more alkyldiborane somewhat lower, than that calculated from the equation.

The rate at which Fuel I is formed is dependent upon the temperature and pressure conditions of the reaction. The production rate in pounds per hour per cubic foot of reactor volume was correlated as a function of temperature for more than 100 reactions performed in a variety of apparatus, e.g., batch reactions in pressurized autoclaves, continuous reactions in stacked and tiered multistage reactors, continuous reactions is packed columns; and over a wide range of conditions, e.g., temperature from 105 to 150° C., pressure from 25 to 70 p.s.i.g. and ethyl diborane to diborane ratios of 3:1 to 80:1. The correlation showed the production rate could be estimated to about ±1.3 pounds per hour per cubic foot by the empirical expression $$\log_{10} R = \frac{7.493T - 2840.4}{T}$$

where R is the production rate in pounds per hour per cubic foot and T is the temperature in degrees Kelvin. The rate of production of Fuel I also increases with increasing reaction pressure; at higher pressures within the operable range the rate will be somewhat higher than the medium rate calculated from the equation.

Fuel I is a mixture of various materials that contain boron, carbon and hydrogen, and it was found that several separate chemical entities could be separated from Fuel I. Fuel I was distilled under vacuum and several fractions were recovered. The more volatile fractions, which constitute a major portion of Fuel I are alkylated pentaboranes. Thus, from Fuel I prepared from ethyldiboranes and diborane there was recovered monoethylpentaborane-(9), diethylpentaborane(9), triethylpentaborane(9), and tetraethylpentaborane(9), which accounted for over one half of the Fuel I sample. The ethylpentaboranes were identified by elemental chemical analysis and infra-red spectrum analysis. The residue of the Fuel I sample after the alkylpentaboranes had been removed were further separated by high vacuum molecular distillation, and was found to contain at least two fractions. The more volatile fraction contains highly ethylated decaborane, e.g., pentaethyldecaborane and hexaethyldecaborane. The less volatile fraction contains as yet unidentified liquid but quite viscous materials containing boron, carbon and hydrogen which are probably polymeric in nature.

Fuel I reacts readily on contact with diborane at a temperature from about 40 to 100° C. and pressures in excess of about 150 p.s.i.g. to form a product of low volatility that contains from about 54 to 62% boron, is predominately lower alkyldecaboranes, and is hereinafter designated as Fuel II. The reaction proceeds readily to give only Fuel II and hydrogen; no solid polymeric byproducts are formed unless the reactants are kept in contact at reaction conditions after all the Fuel I is consumed. It is generally preferred to use a mixture of Fuel I and alkyldiboranes for this reaction, since, if Fuel I alone is used, the liquid phase under reaction conditions becomes quite viscous, and hence is difficult to pump and generally not desirable for continuous reactions. Mixtures of Fuel I and alkyldiboranes containing up to 60 or 70% Fuel I have been used successfully in continuous reaction to produce Fuel II. It is preferred to use mixtures containing less than about 30% Fuel I, since this is the maximum concentration of Fuel I-alkyldiborane mixtures obtained directly from the reaction producing Fuel I. Since Fuel I is the reactant for the preparation of Fuel II it is desirable to have it present in substantial amounts, for if there were only a small concentration of Fuel I there would be only a small concentration of Fuel II in unreacted alkyldiboranes recovered. This reaction is easily performed in a batch or continuous process.

Batch reactions were performed in a pressurized autoclave as was described above for Fuel I reactions. In other batch reactions the liquid products were circulated in a closed loop through a receiver and a reactor-packed columns, wetted wall columns and autoclaves having been successfully used as the reactor. The liquid alkyldiboranes were fed into the top of the reactor, withdrawn from the bottom to the receiver and recirculated to the reactor. Diborane was passed countercurrently to the liquid flow through the reactor and gaseous products were discharged through a water cooled condenser and back pressure regulator. At the completion of the reaction the liquid products were removed from the receiver. Sufficient diborane was fed to the reaction to maintain a predetermined proportion of hydrogen and diborane in the vented gases. These systems were adapted to continuous processing, in which the liquid reactants were fed into the top of the column, and a slip stream was continuously removed from the receiver. Continuous reactions were also performed in stacked and tiered multistage reactors, and in columns in which the Fuel I was countercurrently contacted with diborane with no internal recirculation.

It was found to be advantageous to perform the reactions in a manner that would promote mass transfer from the gas to liquid phase. Thus, for example, batch reactions were performed in a wetted wall column, and in a packed column. The wetted surface area in the packed column was 7 times that of the wetted wall column; the temperature (85° C.), pressure (450 p.s.i.g.), liquid recycle rate (300 cc./min.) and the diborane feed rate (1.5 lb./hr./ft.²) were the same for both reactions. The rate of formation of Fuel II was 280% higher in the packed reactor than in the wetted wall reactor.

Similarly, the other process parameters, e.g., temperature and pressure, affect only the rate at which Fuel II is produced and do not change the elemental content of Fuel II. Increase in temperature and increase in pressure increase the rate of formation. The reaction to produce Fuel II yields by-product hydrogen. The hydrogen is present in the gas phase of the reaction and it has been found that if the concentration of hydrogen is greater than about 70% the reaction is very slow. The hydrogen concentration is controlled by feeding excess diborane and removing a diborane-hydrogen mixture; the more diborane fed the lower the hydrogen concentration in the reactor.

Since Fuel I and Fuel II are both only slightly volatile, they cannot readily be separated, so that if Fuel I is not completely converted into Fuel II during the reaction, i.e., if the reaction is stopped before it is complete, there results a fuel mixture with a composition intermediate to that of Fuel I and Fuel II. Thus, for example, when a mixture of ethyldiboranes and Fuel I which contains 35% boron was contacted with diborane at 400 p.s.i.g. and a temperature of 80° C. the fuel mixture after four hours reaction time contained 49½% boron and after 8 hours it contained 56% boron. Fuel II also contains a higher proportion of hydrogen than Fuel I. For example, when 10 grams of Fuel I (in solution in ethyldiboranes) containing 3.6 grams of boron, 5.2 grams of carbon and 1.2 grams of hydrogen was reacted with diborane, the resultant 18 grams of Fuel II contained 10.4 grams of boron, 5.2 grams of carbon and 2.4 grams of hydrogen. The net addition of boron to Fuel I was 6.8 grams, and of hydrogen 1.2 grams. The empirical composition of the material added to Fuel I to form Fuel II is therefore approximately $(BH_2)_x$. The reaction produces from about 1.8 to 2.2 pounds of Fuel II for each pound of Fuel I used. If the reaction is continued after all of Fuel I has been consumed solid polymeric by-product materials are produced. The variations in composition of Fuel II, e.g., 54 to 62% boron, are believed to be due to differences in the chemical composition including the degree of alkylation of Fuel I starting material.

Lower alkylpentaboranes, such as those separated from Fuel I, react with diborane at moderate temperatures, 50 to 100° C., and at pressures in excess of about 150 p.s.i.g. to form alkyldecaboranes. A series of reactions were performed in which alkylpentaboranes and diborane were charged into a closed pressurized autoclave, and were maintained at desired reaction temperatures and pressures ranging from about 150 to 1500 p.s.i.g. and from about 50 to 100° C. Following the reaction the material volatile at 40° C. and atmospheric pressure was removed leaving a residual product containing alkyldecaborane. The reaction of more highly alkylated pentaboranes gives a product containing more highly alkylated decaboranes. Table IV shows the relation of the boron content of the alkyldecaborane product and the alkylpentaborane starting material.

TABLE IV

*Boron Content of Alkyldecaborane*

| Starting material: | Percent B in alkyldecaborane product |
|---|---|
| Monoethylpentaborane | 71.2 |
| Mixed ethylpentaboranes, B content—27.4% | 56.0 |
| Tetraethylpentaborane | 52.0 |

The boron content of the final alkyldecaborane product apparently depends only on the starting composition of the alkylpentaboranes. The extrinsic variables such as temperature and pressure affect the rate at which the alkyldecaborane is formed but not the final composition. The increase of boron content as the reaction proceeds corresponds to an increase of the concentration of the material with decaborane type structures, as is illustrated in Table V. The alkyldecaborane concentrations were determined by ultraviolet spectrum analyses.

TABLE V

*Relationship of Boron Content of Product and Concentration of Alkyldecaboranes*

| Time | Percent Boron | mmole alkyldecaborane/gram |
|---|---|---|
| 0 | 27.4 | 0 |
| ½ | 44.3 | 1.5 |
| 1 | 49.6 | 2.4 |
| 1½ | 53.0 | 2.8 |
| 2 | 56.0 | 3.1 |
| 2½ | 58.5 | 3.2 |

The reaction produces alkyldecaboranes at a rate which is second order with respect to the diborane concentration. The alkyldecaboranes reach a maximum concentration, and further contact at the same conditions does not produce more alkyldecaboranes. We find that when the reaction is continued further the percentage of boron in the alkyldecaborane product increases slowly; however, there is a large loss to by-product solids and decaborane. There is no solid formation during the reaction prior to the obtaining of the maximum alkyldecaborane content, and the time at which the maximum alkyldecaborane concentration is reached is easily determined by analysis of the reaction mixture.

The liquid products which are produced by the above reactions are useful as high energy fuels in bipropellant systems. These liquid high energy fuels burn readily with conventional oxidizers, including air and oxygen, and are primarily useful in turbojet, ram jet, and rocket engines. These fuels may be used alone or in mixtures with other fuels toward which they are chemically inert, e.g., most ordinary hydrocarbon fuels. These fuels have a high heat of combustion (greater by 20–50% than the best hydrocarbon fuels), are spontaneously inflammable in air at high temperatures (in excess of 250°–300° F.), and have other desirable fuel properties, e.g., large liquidus range, low viscosity, stability against thermal decomposition and moderately resistant to hydrolysis. In actual tests the fuel produced by the above process is used as follows: A sample of the fuel is introduced into the combustion section of a jet test engine, burned with compressed air, and the efficiency of the combustion and output of the engine measured. When this fuel was burned in a test engine it was found to have a heat of combustion more than 20% greater than the best hydrocarbon fuels. The combustion efficiency of this fuel was equal to JP–4 (a standard jet fuel in use for several years past) and the thrust of the engine per unit weight of fuel was substantially greater than the thrust obtained using the best hydrocarbon fuels. In comparative tests on the fuel produced by the above process and other boron-containing high energy fuels and other hydrocarbon fuels it has been found that engine output is directly proportional to the heat of combustion per unit weight of fuel. Thus, an aircraft using a high energy boron-containing fuel can travel proportionately further with the same load or can carry proportionately greater loads than when fueled with conventional fuels. When it is desired to use these fuels mixed with hydrocarbons, they may be treated with a light hydrocarbon solvent, to remove hydrocarbon insoluble components.

According to the provisions of the patent statutes, I have explained the principle and mode of practicing my invention, have described what I now consider to be its best embodiments. However, I desire to have it understood that, within the scope of the appended claims, the invention may be practiced otherwise than as specifically described.

We claim:

1. A method of preparing lower alkylpentaboranes which comprises the step of reacting diborane and a compound selected from the group consisting of lower alkyldiboranes and mixtures thereof at a temperature between about 110° C. and 170° C. and a pressure between about 15 and 70 p.s.i.g. and recovering the alkylpentaboranes formed.

2. A method according to claim 1 in which the ratio of alkyldiboranes to diborane is between about 5 to 1 and 20 to 1.

3. A method of preparing a liquid fuel product containing B, C, and H, and that contains a high proportion of ethylpentaboranes which comprises reacting diborane and ethyldiboranes at a temperature between about 110° C. and 170° C. and a pressure between about 15 and 70 p.s.i.g., recovering a mixture of fuel product and unreacted ethyldiborane containing less than about 30% fuel product and recovering the fuel product therefrom.

4. A method according to claim 1 in which the alkyldiboranes are ethyldiboranes and the alkylpentaboranes are ethylpentaboranes.

5. A method of preparing a liquid fuel product containing B, C, and H, that is predominately alkyldecaboranes which comprises the steps of reacting diborane and a material selected from the group consisting of lower alkyldiboranes and mixtures thereof at a temperature between about 110° C. and 170° C. and a pressure between about 15 and 70 p.s.i.g., whereby a liquid intermediate product is formed, and reacting said intermediate product with diborane at a temperature between about 40° C. and 100° C. and a pressure in excess of 150 p.s.i.g. and recovering the liquid fuel product formed containing predominately alkyldecaboranes.

6. A method according to claim 5 in which the alkyldiboranes are ethyldiboranes and the liquid fuel product is predominately ethyldecaboranes.

7. A method according to claim 6 in which the intermediate product is reacted with diborane in the presence of ethyldiboranes.

8. A method of preparing a liquid fuel product containing B, C, and H, and that contains predominately ethyldecaboranes which comprises the steps of reacting diborane and ethyldiboranes at a temperature between about 110° C. and 170° C. and a pressure of between about 15 and 70 p.s.i.g., with a ratio of ethyldiboranes to diborane between about 5 to 1 and 20 to 1, recovering a mixture of the intermediate product formed and unreacted ethyldiboranes containing more than about 70% ethyldiboranes, reacting said mixture with diborane at a temperature between about 40° C. and 100° C. and a pressure in excess of about 150 p.s.i.g., and maintaining the concentration of hydrogen in the gas phase below about 70 mole percent, and recovering the liquid fuel product formed.

9. A method of preparing lower alkyldecaboranes that comprises the step of reacting diborane with a material selected from the group consisting of lower alkylpentaboranes and mixtures of lower alkylpentaboranes and alkyldiboranes at a temperature between about 40° C. and 100° C. and a pressure in excess of about 150 p.s.i.g. and recovering the alkyldecaboranes formed.

10. A method according to claim 9 in which the alkylpentaboranes are ethylpentaboranes.

11. A method according to claim 10 in which the ethylpentaborane is monoethylpentaborane.

No references cited.

UNITED STATES PATENT OFFICE
CERTIFICATE OF CORRECTION

Patent No. 3,135,802                                 June 2, 1964

Thomas R. Kendrick III et al.

It is hereby certified that error appears in the above numbered patent requiring correction and that the said Letters Patent should read as corrected below.

Column 1, line 14, for "$H_2$" read -- $B_2$ --; lines 31 and 47, for "alkyldecarboranes", each occurrence, read -- alkyldecaboranes --; column 2, line 36, and column 3, line 27, for "alkyldecarborane", each occurrence, read -- alkyldecaborane --; column 4, line 71, for "=45+(0.1P-0.75)" read -- =45+(0.01P-0.75) --.

Signed and sealed this 20th day of October 1964.

(SEAL)
Attest:

ERNEST W. SWIDER                                EDWARD J. BRENNER
Attesting Officer                                      Commissioner of Patents